L. J. CAMPBELL.
NUT LOCK.
APPLICATION FILED MAY 27, 1911.

1,042,765.

Patented Oct. 29, 1912.

WITNESSES:

INVENTOR
Leon J. Campbell
BY
W. W. Withenbury
ATTORNEY

UNITED STATES PATENT OFFICE.

LEON J. CAMPBELL, OF CHICAGO, ILLINOIS, ASSIGNOR TO JAMES T. HEALY, TRUSTEE, OF CHICAGO, ILLINOIS.

NUT-LOCK.

1,042,765.  Specification of Letters Patent.  Patented Oct. 29, 1912.

Application filed May 27, 1911. Serial No. 629,945.

*To all whom it may concern:*

Be it known that I, LEON J. CAMPBELL, a citizen of the United States, and residing at Chicago, in the county of Cook and State of Illinois, have invented a new and useful Improvement in Nut-Locks, of which the following is a complete specification.

The main objects of this invention are to provide an improved nut lock which is adapted to firmly grip the bolt on which it is used to prevent its removal from the bolt; to provide a nut lock of cheap and simple construction which is adapted to be easily attached to the bolt, and which will efficiently hold the nut in place; and to provide a nut lock, which, while adapted to be rigidly attached to the bolt, may be easily removed when desired.

The invention consists of the matters hereinafter described in the specification and more fully pointed out and defined in the appended claims.

Figure 1:
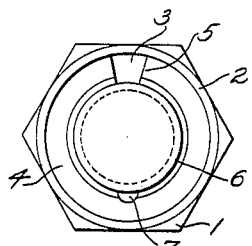
Figure 2:
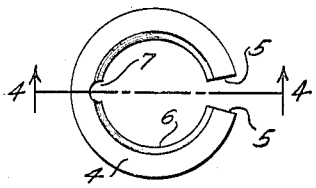
Figure 5:
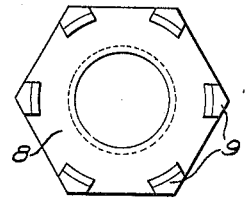
Figure 3:
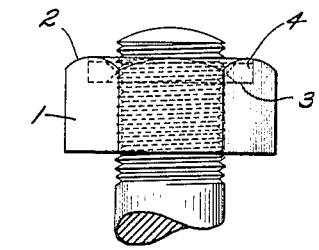
Figure 4:
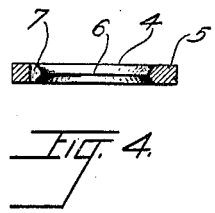
Figure 6:
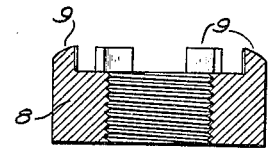
Figure 7:
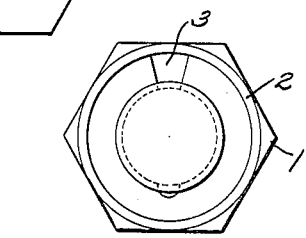
Figure 8:
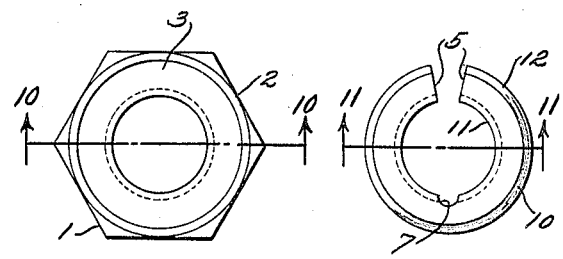
Figure 9:
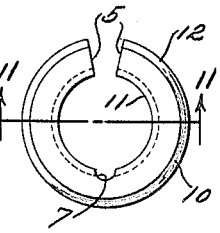
Figure 12:
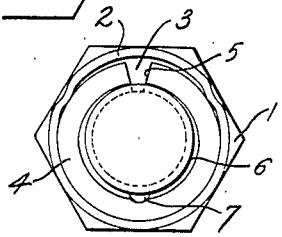
Figure 10:
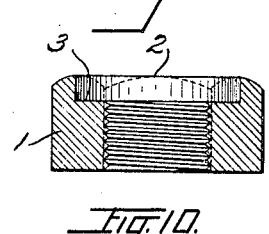
Figure 11:
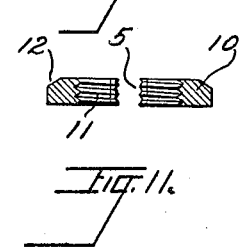

In the drawings: Figure 1 is an end elevation of a preferred form of nut lock embodied in this invention. Fig. 2 is a face view of the locking washer. Fig. 3 is a side elevation of the nut lock attached to a bolt. Fig. 4 is a section taken on line 4—4 of Fig. 2. Fig. 5 is an end elevation of a slightly modified form of the nut. Fig. 6 is a central longitudinal section of the nut shown in Fig. 5. Fig. 7 is an end elevation of the nut lock having a slightly modified form of locking washer. Fig. 8 is an end elevation of the nut shown in Figs. 1 and 7 with the washer removed. Fig. 9 is a face view of the locking washer shown in Fig. 7. Fig. 10 is a section taken on line 10—10 of Fig. 8. Fig. 11 is a section taken on line 11—11 of Fig. 9. Fig. 12 is an end elevation of the nut lock shown in Fig. 1 with the parts in locking position.

As shown in the drawings, the nut 1 is an ordinary hexagonal nut, though obviously it may be of any other preferred or well known form, and it is provided at its outer end or face with a flange 2 which is concentric with the bore of the nut and provides a cup, seat, or washer retainer 3 in the outer end of the nut adapted to contain the washer. Adapted to seat in said cup or retainer 3 is a resilient washer 4, the thickness of which is slightly less than the depth of the cup, as shown more clearly in Fig. 3 to enable the margin of the cup, or portions thereof, to be turned over the same. The washer 4 is broken or divided at one side thereof, and the ends 5 thus formed are normally spaced a distance apart, as shown in Figs. 1 and 2 to permit them to be sprung toward each other when the nut lock is on the bolt. The internal diameter of the washer 4 is normally slightly greater than the internal diameter of the nut 1, as shown more clearly in Fig. 1, so that the washer will slip over the end of the bolt and into the cup or retainer after the nut is on the bolt. The inner edge 6 of the washer is V shaped in cross section to permit it to cut into the threads of the bolt when in locking position. To enable the washer to be more readily sprung into gripping engagement with the bolt it is provided with a notch 7 at a point diametrically opposite from the ends 5, which notch tends to weaken the washer at that point and render it more pliable.

In operation the nut 1 is placed on the bolt with the cup 3 at the outer end of the nut, and the washer 4 is inserted over the end of the bolt and into the cup. The side walls of the cup are then struck with a hammer or other instrument and are forced or bent inwardly against the washer, and cause the ends of the washer to be sprung together, as shown in Fig. 12, so that the washer will grip the bolt threads.

In the construction shown in Figs. 5 and 6 the nut 8 is provided on its outer end and at the outer edge thereof with a plurality of fingers or lugs 9 which are arranged at the corners of the nut. Said fingers provide the washer seat, cup or retainer and are adapted to be bent or turned inwardly against the washer to force the washer into gripping engagement with the bolt. In the construction shown in Figs. 7, 9, and 11, the washer 10 is identical with the washer 4 with the exception that it is provided on its inner edge with screw threads 11 which are of the same size as the threads of the bolt and permit the washer to be threaded onto the bolt, and when the edges of the cup 3 are forced inwardly the washer is brought into close frictional engagement with the bolt and prevents the nut from working loose. In this construction also, in order to provide sufficient threads on the washer for engagement with the bolt, the washer may be made slightly thicker than the washer 4 and have its outer edge beveled off at 12 to permit the edge of the cup to be turned over it. When it is desired to remove either of the nuts shown from the bolt it is only necessary to bend the edge of the cup, or the fingers as the case may be, back to normal position, and the washer will spring away from the bolt sufficiently to permit the nut to be removed.

Obviously a nut lock constructed in accordance with this invention will be of cheap and simple construction and very effective in its operation, and obviously also, many details of the constructions shown may be varied or omitted without departing from the scope of the claims.

I claim:

1. A nut lock, comprising a nut having integral, concentrically arranged washer retaining means at its outer end adapted to be turned inwardly against the washer, and a split washer adapted to be held in said retaining means and to be forced into gripping engagement with a bolt when the retaining means are turned inwardly against the washer.

2. A nut lock, comprising a nut having a washer seat formed in one end, and a split washer adapted to be contained in said seat, the margins of said seat being adapted to be turned inwardly against the washer and to spring the washer into gripping engagement with a bolt.

3. A nut lock, comprising a nut having a cup at its outer end and adapted to receive a washer therein, and a split resilient washer adapted to be carried in said cup, the margins of said cup being adapted to be forced inwardly against the washer to spring the washer into gripping engagement with a bolt.

4. A nut lock, comprising a nut having a washer seat in its outer end and adapted to have its margins bent inwardly against the washer, and a split washer having a notch in one side thereof and adapted to be sprung by said margins into gripping engagement with a bolt.

5. A nut lock, comprising a nut having a washer seat at its outer end adapted to contain a washer, and a split washer in said seat having a V shaped inner edge, the margins of said seat being adapted to be turned inwardly against the washer and to spring the washer into gripping engagement with a bolt.

6. A nut lock, comprising a nut having longitudinally directed integral retaining means on its outer end and arranged concentrically with the bore of the nut, and a contractible locking member adapted to seat within said retaining means, said retaining means being adapted to be bent inwardly toward the bore of the nut and force the locking member into gripping engagement with the bolt.

In witness whereof I have hereunto subscribed my name in the presence of two witnesses.

LEON J. CAMPBELL.

Witnesses:
JAS. T. HEALY,
W. W. WITHENBURY.